STATIC RELAY USING PHOTOCONDUCTIVE CELL AND NEON BULB

Filed Dec. 15, 1967

INVENTOR.
Victor E. Stewart, Jr.
BY Fred Wiviott
Attorney

3,523,187
STATIC RELAY USING PHOTOCONDUCTIVE CELL AND NEON BULB

Victor E. Stewart, Jr., South Milwaukee, Wis., assignor to McGraw-Edison Company, Milwaukee, Wis., a corporation of Delaware

Filed Dec. 15, 1967, Ser. No. 691,021
Int. Cl. H01j *39/12*
U.S. Cl. 250—206 18 Claims

ABSTRACT OF THE DISCLOSURE

A static switching circuit useable for coupling a position encoder in an automatic remote information transferring system. The static relay includes a voltage responsive light emitting breakdown device and a photo-sensitive device whose impedance is a function of incident radiation and which are connected in series. An RC time delay or frequency selective impedance circuit is connected in parallel with the series combination and coupled to the voltage sensitive breakdown device to provide an excitation level-time or frequency response.

BACKGROUND OF THE INVENTION

This invention relates to a static relay and, more particularly, to a static relay which is excitation level-time responsive to a predetermined electrical signal.

In certain applications it is desirable to provide a static relay which is responsive to frequency or excitation level as a function of time. For example, in an automatic remote meter reading system employing a telephone system, it may be desirable to provide a relay for coupling a transponder to the telephone lines upon receiving a predetermined excitation but which is not responsive to relatively higher voltage ringing and dialing signals which are of short duration. In such applications it may also be desirable to provide static relays which are responsive to predetermined frequency ranges or to the transfer of small quantities of energy.

It is an object of the invention to provide a new and improved static relay.

Another object of the invention is to provide a static relay which is excitation level-time responsive.

A further object of the invention is to provide a static relay which displays memory characteristics.

A still further object of the invention is to provide a static relay which has relatively high A.C. and D.C. impedance in its OFF state and relatively low A.C. and D.C. impedance in its ON state.

Yet another object of the invention is to provide a static relay which is bi-directional.

A further object of the invention is to provide a static switching circuit which is frequency level responsive.

Still another object of the invention is to provide a frequency responsive static switching circuit which may be activated by the transfer of relatively small quantity of energy.

These and other objects and advantages of the instant invention will become more apparent from the detailed description of the preferred embodiment taken with the accompanying drawings and description hereinbelow.

SUMMARY OF THE INVENTION

In general terms, the invention comprises impedance means having a plurality of impedance levels and excitation level responsive means for changing the impedance level of the impedance means in response to a predetermined excitation, and energy storage means for receiving the exciting signal and actuating the responsive means when the excitation signal has a predetermined level.

DESCRIPTION OF THE PREFERRED EMBODIMENTS

Figure 1:
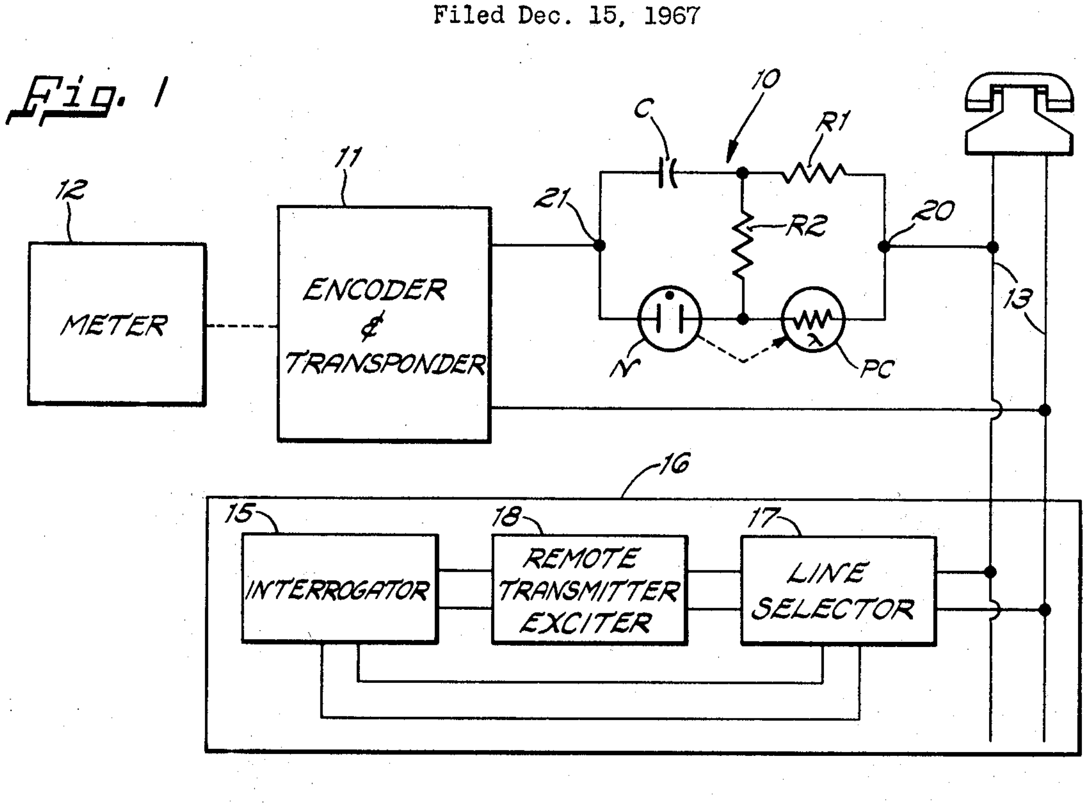
FIG. 1 schematically illustrates a remote meter reading system having a static relay according to the instant invention.

The drawing shows an automatic remote meter reading system in which the static relay 10 according to the invention is useable and which includes an encoder 11 mechanically coupled to the meter 12 which is being read and to the customer's telephone line 13 through the static relay 10. In addition, an interrogator 15 at the telephone exchange 16 is coupled to the line 13 through a line selector 17 and a remote transmitter exciter 18 and various telephone equipment (not shown, but well known in the art).

The details of the encoder 11, the meter 12, the interrogator 15, the line selector 17 and the remote transmitter exciter 18 form no part of the instant invention and, accordingly, will not be discussed in detail. It is sufficient for purposes of understanding the invention to note that when it is desired to read the meter 12, the interrogator 15 is actuated and, in turn, actuates the line selector 17 and the remote transmitter exciter 18. The remote transmitter exciter 18 then sends a signal through the line 13 which actuates the static relay 10, whereby the encoder 11 is actuated and coupled to the line 13. The encoder 11 provides coded information relative to the registration of the meter 12 to the interrogator 15. For example, the encoder may include an oscillator (not shown) whose parameters are modified as a function of the meter registration, whereby different tone signals will be placed on the line 13 in accordance with the reading of meter 12.

For a more complete description of an encoder 11 useable with the instant invention, reference is made to copending application Ser. No. 690,980, filed Dec. 15, 1967, and assigned to the assignee of the instant invention.

The static relay 10 includes a photocell PC and a neon lamp N which are connected in series with each other and by terminals 20 and 21 between one of the customer lines 13 and the encoder 11. The static relay 10 also includes a resistor R1 and a capacitor C which are connected in series with each other and the series combination connected between terminals 20 and 21. A second resistor R2 connects the junction between resistor R1 and capacitor C to that between photocell PC and neon lamp N.

The photocell PC may be composed of a material, such as selenium or cadmium sulfide, which has a relatively high impedance when unilluminated and a relatively low impedance when illuminated.

The normal telephone central office battery voltage applied to the lines 13, which is in the order of 48 volts D.C., is insufficient to fire the neon lamp N, so that static relay 10 is normally inactive or in an OFF state and terminals 20 and 21 are effectively open circuited.

High dialing and ringing peak voltages, which may be in the order of 400 volts, are of insufficient duration to sufficiently charge capacitor C to the level required for operation of relay 10.

When the remote transmitter exciter 18 is actuated, a voltage of approximately 200 volts is applied between lines 13. As a result, sufficient charge will accumulate on capacitor C to break down neon lamp N, causing the latter to illuminate the photocell PC. This, in turn, causes the photocell to go from a high impedance state to a low impedance state, thereby connecting the terminals 20 and 21. As long as the input voltage signal is greater than the lamp extinguishing voltage, lamp N will remain illuminated so that the relay 10 will remain latched in its conductive or ON state.

It will be appreciated that, when the relay 10 is initially OFF, the high impedance of the photocell PC will limit the rate to which energy may be furnished to the capacitor C. When the excitation level is raised sufficiently to enable the capacitor voltage to reach the breakdown potential of lamp N, the capacitor discharge current furnishes the energy which enables the lamp to initially illuminate the photocell PC. This, in turn, lowers the photocell resistance so that current furnished by the excitation is sufficient to maintain the photocell-lamp circuit in its ON or conductive state.

When the source excitation voltage is discontinued, the voltage will be insufficient to maintain the lamp N in its breakdown condition, so that it will discontinue conducting and the radiation to the photocell PC will be interrupted. This, in turn, changes the photocell PC from its low impedance state to its high impedance state, thereby again effectively open circuiting terminals 20 and 21.

Because the resistance R1 does not carry load current, it may be relatively large, so that the capacitor C may be relatively small and, hence, inexpensive. The size of the capacitor C need only be great enough to store sufficient charge to maintain the lamp N conductive, and between its breakdown and extinguishing voltage levels, long enough to switch the photocell PC from its high to its low impedance state. Upon the latter event, the load current between terminals 20 and 21 will maintain the lamp N conductive.

It will be appreciated that, while the relay 10 has been discussed with respect to a D.C. voltage, it will operate when energized by an A.C. voltage as well. It will also be appreciated that the relay 10 is bi-stable, in which it provides high A.C. and D.C. impedances when in its OFF state and low A.C. and D.C. impedances when in its ON state.

In addition, the relay 10 is responsive to the magnitude and time of the excitation voltage so that high momentary voltages will not actuate the device, nor will continuous low magnitude excitation. The time discriminating chracteristic of the relay 10 allows the breakdown voltage of the lamp N to be lower than peak A.C. transient or D.C. pulse voltages which may occur between conductors 20 and 21 without the relay 10 being turned on. It will also be appreciated that the relay 10 according to the instant invention is bi-directional so that signals may be transmitted in either direction between the terminals 20 and 21.

The relay 10 may also provide memory characteristics in that it will recouple after being turned OFF in a shorter time than its original turn ON time because of the charge stored on capacitor C and the limited conductivity fall time of the photocell PC.

When the relay 10 is energized by an A.C. source, it will also be frequency responsive. Thus, because the impedance of capacitor C is inversely related to the fresuency of the signal at the terminals 20 and 21, its percentage of the total input voltage will vary inversely with frequency. As a result, the relay 10 is responsive to frequencies below a predetermined level.

Figure 2:
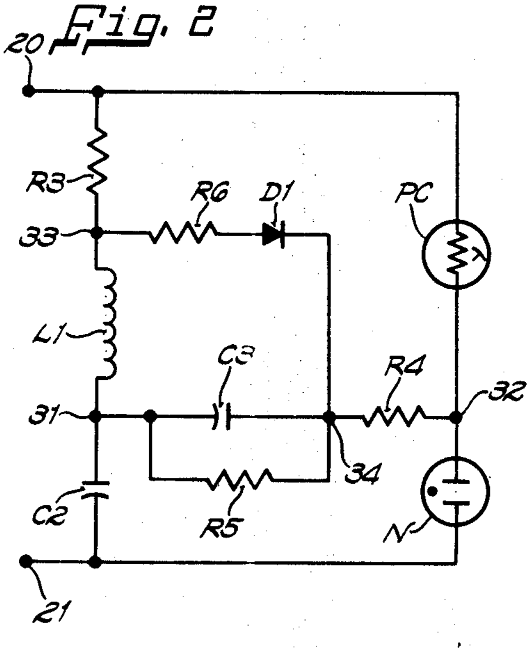
FIG. 2 illustrates a band frequency responsive static switching circuit.

FIG. 2 shows a modifid form of the invention which is responsive to frequencies above a predetermined level. Here a resistor R3, an inductance L1 and a capacitor C2 are connected in series between the input terminals 20 and 21. In addition, a second capacitor C3 and a resistor R4 are connected in series between the junction 31 of capacitor C2 and inductor L1 and the junction 32 of lamp N and photocell PC. A discharge resistor R5 shunts capacitor C3, and a fourth resistor R6 and a diode D1 are connected between the junction 33 of resistor R3 and inductor L1 and junction 34 of capacitor C3 and resistor R4. It will be appreciated that the peak voltage across inductor L1 will be directly related to frequency, and this voltage is applied to the capacitor C3. When the input signal frequency is sufficiently high, the energy stored in capacitors C2 and C3 will be sufficient to fire lamp N and maintain it in its conductive state to switch photocell PC.

Figure 3:
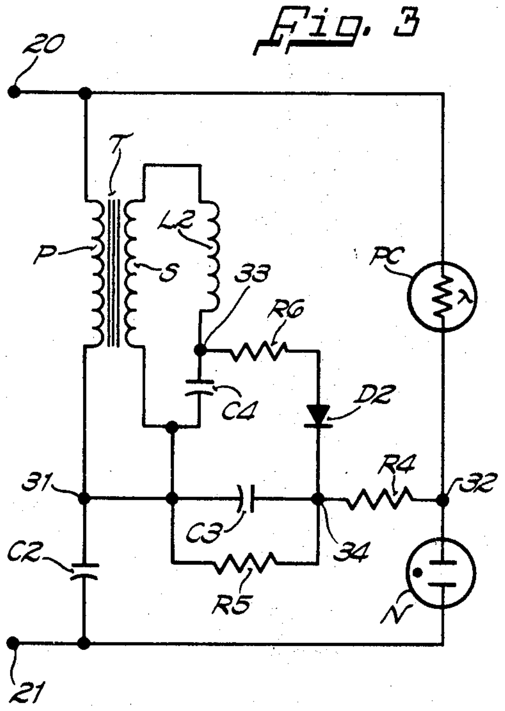
FIG. 3 shows a high frequency responsive static switching circuit.

FIG. 3 shows a further modification of the invention which is responsive to frequencies within a predetermined band. This circuit is similar to that shown in FIG. 2, except that the inductor L1 and resistor R3 of FIG. 2 are replaced in FIG. 3 by a transformer T and a resonant circuit consisting of inductor L2 and capacitor C4. The primary winding P of transformer T is connected in series with capacitor C2, and the series resonant circuit L2 and C4 is connected across the secondary winding S. When the frequency of the input signal is within a predetermined band, the voltage across the resonant circuit L2 and C4, which is applied across capacitor C3, will be sufficiently high, when added to that across capacitor C2, to fire the lamp N.

It has been found that with the circuit of FIG. 3 the lamp N and the photocell PC can be switched by the transfer of as little as one milliwatt of energy for one second, assuming the capacitors C2 and C3 are initially charged to a value insufficient to cause operation. This is important because in certain applications, such as telephone systems, the permissible energy transfer is limited to such values.

While only a few embodiments of the invention have been shown and described, it is not intended to be limited thereby, but only by the scope of the appended claims.

I claim:

1. In a static relay, the combination of terminal means, first and second circuit means interconnected with said terminal means, said first circuit means comprising impedance means having a plurality of impedance levels, said second circuit means comprising excitation level responsive means operatively associated with said first means for changing the impedance level thereof in response to a predetermined excitation, and third circuit means comprising energy storage means and impedance means, said third circuit means being interconnected with said second circuit means and connected directly to said terminal means for actuating said second circuit means when an electrical signal of a predetermined duration appears at said terminal means.

2. The static relay set forth in claim 1 wherein said third circuit means includes means for delaying the operation of said second circuit means.

3. The static relay set forth in claim 1 wherein said third circuit means includes reactive impedance means for actuating said second circuit means when the electrical signal at said terminal means is within a predetermined frequency range.

4. The static relay set forth in claim 1 wherein said first circuit means has a high impedance state and a low impedance state, said second circuit means being operable in response to said predetermined excitation level to change said first circuit means from its high to its low impedance state.

5. The static relay set forth in claim 1 wherein said second circuit means is radiation emissive and said first circuit means is radiation responsive impedance means.

6. The static relay set forth in claim 4 wherein said second circuit means is positioned adjacent said first circuit means.

7. The static relay set forth in claim 6 wherein said second circuit means is a voltage responsive light emitting breakdown device and said first circuit means is a photosensitive device whose impedance is a function of incident radiation.

8. The static relay set forth in claim 1 wherein said first circuit means comprises photosensitive means having a high impedance state when unilluminated and a low impedance state when illuminated, and said second circuit means comprises a breakdown lamp means.

9. The static relay set forth in claim 8 wherein said photosensitive means and said lamp means are connected in a series circuit relation and said energy storage means is connected in a shunt circuit relation only with said lamp means.

10. In a static relay, the combination of terminal means, first and second circuit means connected in a series circuit relation and interconnected with said terminal means, said first circuit means comprising impedance means having a plurality of impedance levels, said second circuit means comprising excitation level responsive means operatively associated with said first means for changing the impedance level thereof in response to a predetermined excitation, and third circuit means comprising energy storage means and impedance means, said energy storage means being connected in a parallel circuit relation only with said second circuit means, said third circuit means being interconnected with said second circuit means and said terminal means for actuating said second circuit means when a predetermined electrical signal appears at said terminal means.

11. In a static relay, the combination of terminal means, first and second circuit means interconnected with said terminal means, said first circuit means comprising impedance means having a plurality of impedance levels, said second circuit means comprising excitation level responsive means operatively associated with said first means for changing the impedance level thereof in response to a predetermined excitation, and third circuit means for actuating said second circuit means when a predetermined electrical signal appears at said terminal means, said third circuit means comprising capacitance means and resistance means, said resistance means being in circuit between said capacitance means and said terminal means and also between said capacitance means and said second circuit means.

12. In combination with a telephone line and transponder means for producing coded information, a static relay comprising terminal means connected between the telephone line and transponder means, first and second circuit means interconnected with said terminal means, said first circuit means including impedance means having a plurality of impedance levels, said second circuit means comprising excitation level responsive means operatively associated with said first means for changing the impedance level thereof in response to a predetermined excitation, and third circuit means comprising capacitive impedance means, said third circuit means being interconnected with said second circuit means and said terminal means for actuating said second circuit means when an electrical signal below a predetermined frequency appears at said terminal means whereby coded information from said transponder means is applied to the telephone line.

13. In combination with a telephone line and transponder means for producing coded information, a static relay comprising terminal means connected between the telephone line and transponder means, first and second circuit means interconnected with said terminal means, said first circuit means including impedance means having a plurality of impedance levels, said second circuit means comprising excitation level responsive means operatively associated with said first means for changing the impedance level thereof in response to a predetermined excitation, and third circuit means comprising inductive impedance means, said third circuit means being interconnected with said second circuit means and said terminal means for actuating said second circuit means when an electrical signal above a predetermined frequency appears at said terminal means whereby coded information from said transponder means is applied to the telephone line.

14. In combination with a telephone line and transponder means for producing coded information, a static relay comprising terminal means connected between the telephone line and transponder means, first and second circuit means interconnected with said terminal means, said first circuit means including impedance means having a plurality of impedance levels, said second circuit means comprising excitation level responsive means operatively associated with said first means for changing the impedance level thereof in response to a predetermined excitation, and third circuit means comprising inductive and capacitive impedance means, said third circuit means being interconnected with said second circuit means and said terminal means for actuating said second circuit means when an electrical signal having a frequency within a predetermined band appears at said terminal means whereby coded information from said transponder means is applied to the telephone line.

15. The static relay set forth in claim 11 wherein said first means comprises photosensitive means having a high impedance state when unilluminated and a low impedance state when illuminated, and said second means comprises a breakdown lamp means.

16. The static relay set forth in claim 13 wherein said second means is radiation emissive and said first means is radiation responsive impedance means.

17. The static relay set forth in claim 14 wherein said second means is radiation emissive and said first means is radiation responsive impedance means.

18. The static relay set forth in claim 15 wherein said first and second means is connected in a series circuit relation and said capacitance means is connected in a shunt circuit relation with said first means.

References Cited

UNITED STATES PATENTS

| | | | |
|---|---|---|---|
| 3,389,263 | 6/1968 | Niccolis | 250—209 |
| 3,175,090 | 3/1965 | Reis et al. | 250—209 |

ARCHIE R. BORCHELT, Primary Examiner

M. ABRAMSON, Assistant Examiner

U.S. Cl. X.R.

250—209, 214; 307—311